(12) United States Patent
Xue et al.

(10) Patent No.: US 12,605,766 B2
(45) Date of Patent: Apr. 21, 2026

(54) METHODS FOR UPPER PLATEN MANUFACTURING

(71) Applicant: Applied Materials, Inc., Santa Clara, CA (US)

(72) Inventors: Ximeng Xue, Santa Clara, CA (US); David J. Lischka, Austin, TX (US); Jay Gurusamy, Santa Clara, CA (US); Steven M. Zuniga, Soquel, CA (US); Jeonghoon Oh, Saratoga, CA (US); Jagan Rangarajan, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 405 days.

(21) Appl. No.: 18/183,000

(22) Filed: Mar. 13, 2023

(65) Prior Publication Data

US 2024/0307963 A1    Sep. 19, 2024

(51) Int. Cl.
*B22F 10/28* (2021.01)
*B22F 10/66* (2021.01)
(Continued)

(52) U.S. Cl.
CPC .............. *B22F 10/28* (2021.01); *B22F 10/66* (2021.01); *B29C 64/153* (2017.08); *B29C 64/30* (2017.08);
(Continued)

(58) Field of Classification Search
CPC ....... B29C 64/153; B29C 64/30; B33Y 30/00; B33Y 10/00; B33Y 50/02; B22F 10/28; B22F 10/66; B22F 15/55
See application file for complete search history.

(56) References Cited

U.S. PATENT DOCUMENTS 6,219,237 B1 * 4/2001 Geusic ................. H01L 23/473
                                                                361/720
10,456,976 B1 * 10/2019 Boyle .................... B29C 64/30
(Continued)

FOREIGN PATENT DOCUMENTS

JP          2000354956 A      12/2000

OTHER PUBLICATIONS

International Search Report/ Written Opinion issued to PCT/US2024/ 013962 on Jun. 3, 2024.

*Primary Examiner* — Nahida Sultana
(74) *Attorney, Agent, or Firm* — Patterson + Sheridan, LLP

(57) ABSTRACT

Embodiments of the disclosure provided herein include an apparatus and method for additive manufacturing a component for a semiconductor processing apparatus. The apparatus for additive manufacturing includes a printhead configured to selectively deposit layers on build the component, wherein the printhead may selectively deposit a first set of layers onto the build platform, and selectively deposit a second set of layers on the first set of layers, each of the second set of layers comprising a gap that forms a cooling channel through the component. The cooling channel is filled a filler material. A third set of layers covers the cooling channel before the channel is exposed to a liquidizing agent, wherein the liquidizing agent reacts with the filler material to produce an effluent fluid which is then drained. In other embodiments, the cooling channel may be machined into the component before being filled with the filler material.

13 Claims, 6 Drawing Sheets

(51) Int. Cl.

| | |
|---|---|
| *B29C 64/153* | (2017.01) |
| *B29C 64/30* | (2017.01) |
| *B33Y 10/00* | (2015.01) |
| *B33Y 50/02* | (2015.01) |
| *B33Y 70/10* | (2020.01) |
| *B33Y 80/00* | (2015.01) |

(52) U.S. Cl.

CPC ............... *B33Y 10/00* (2014.12); *B33Y 50/02* (2014.12); *B33Y 70/10* (2020.01); *B33Y 80/00* (2014.12)

(56) References Cited

U.S. PATENT DOCUMENTS

| 2009/0173443 A1* | 7/2009 | Kozlak ................. B29C 64/106 |
|---|---|---|
| | | 156/303.1 |
| 2017/0140956 A1* | 5/2017 | McLaughlin ..... H01L 21/67103 |
| 2021/0205890 A1 | 7/2021 | Ng et al. |
| 2021/0260826 A1 | 8/2021 | Lei et al. |
| 2022/0367227 A1 | 11/2022 | Okamoto et al. |

\* cited by examiner

350

DEPOSIT A FIRST SET OF LAYERS ONTO A
BUILD PLATFORM                                    352

SELECTIVELY DEPOSIT A SECOND SET OF LAYERS
ONTO THE FIRST SET OF LAYERS TO FORM            354
COOLING CHANNELS

DEPOSIT A THIRD SET OF LAYERS ONTO THE
SECOND SET OF LAYERS TO FORM A COVER            356

400

FORM COOLING CHANNELS INTO MAIN BODY
OF PLATEN                                    402

FILL COOLING CHANNELS WITH A FILLER
MATERIAL                                     404

ADDITIVELY MANUFACTURE COVER ONTO THE
MAIN BODY OF PLATEN                          406

FILL COOLING CHANNELS WITH LIQUIDIZING AGENT
TO PRODUCE EFFLUENT FLUID                    408

DRAIN THE EFFLUENT FLUID FROM THE
COOLING CHANNELS                             410

METHODS FOR UPPER PLATEN MANUFACTURING

BACKGROUND

Field

Embodiments of the present disclosure generally relate to a semiconductor systems, processes, and equipment. More specifically, the present disclosure relates to chemical mechanical polishing equipment and methods of manufacturing the same.

Description of the Related Art

An integrated circuit is typically formed on a substrate by the sequential deposition of conductive, semiconductive, and/or insulative layers on a silicon wafer. A variety of fabrication processes use the planarization of a layer on the substrate between processing steps. For example, for certain applications, e.g., polishing of a metal layer to form vias, plugs, and/or lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one common method of planarization. This planarization method typically requires that the substrate be mounted on a carrier or polishing head. The exposed surface of the substrate is typically placed against a rotating polishing pad. The carrier head provides a controllable load on the substrate to push it against the polishing pad. Abrasive polishing slurry is typically supplied to the surface of the polishing pad.

An upper platen may be used as a polishing platform for substrates during a CMP process. The upper platen spins during the polishing process, allowing the surface of the substrate to be polished. The upper platen may include cooling channels to remove heat from the substrate produced during the polishing process.

Manufacturing of the upper platen includes machining the cooling channels into a platen main body then attaching a cover. The cover is bonded to the main body using a brazing process, e.g., a clad braze sheet. The brazing process, however, is expensive and slows the manufacturing of the upper platen.

Accordingly, there is a need for an improved manufacturing process for the upper platen that reduces cost and manufacturing time.

SUMMARY

Embodiments described herein generally relate to systems and methods used for manufacturing of an upper platen for chemical mechanical polishing (CMP). More particularly, embodiments provided herein include improved systems and methods for additively manufacturing an upper platen, either fully or partially, that has cooling channels within its main body.

In an embodiment, an apparatus for additive manufacturing a component for a semiconductor processing apparatus is provided. In this embodiment, the apparatus for additive manufacturing includes a build platform, a printhead configured to selectively deposit layers on the build platform, a controller configured to control operation of the apparatus and cause the printhead to selectively deposit a first set of layers onto the build platform, and selectively deposit a second set of layers on the first set of layers, each of the second set of layers comprising at least one gap, wherein the first set of layers and the second set of layers form the component, and wherein the at least one gap forms at least one cooling channel through the component. The controller further configured to fill the at least one cooling channel with a filler material before a third set of layers covers the at least one cooling channel. The at least one cooling channel is then filled with a liquidizing agent, wherein the liquidizing agent reacts with the filler material to produce an effluent fluid.

In another embodiment, a method for manufacturing a component for a semiconductor processing apparatus is provided. In this embodiment, the method includes selectively depositing a first set of layers using an additive manufacturing apparatus, and selectively depositing a second set of layers on the first set of layers, each of the second set of layers comprising at least one gap, wherein the first set of layers and the second set of layers form the component, and wherein the at least one gap forms at least one cooling channel through the component. The method further includes selectively depositing a filler material in the at least one cooling channel before depositing a third set of layers to cover the at least one cooling channel. The at least one cooling channel is then filled with a liquidizing agent, wherein the liquidizing agent reacts with the filler material to produce an effluent fluid.

In yet another embodiment, a method of manufacturing a component for a semiconductor processing apparatus is provided. In this embodiment, the method includes machining at least one cooling channel into a surface of a component main body, filling the at least one cooling channel with a filler material, depositing layers over a surface of the component main body to form a cover over the filler material, filling the at least one cooling channel with a liquidizing agent, wherein the liquidizing agent reacts with the filler material to produce an effluent fluid, and draining the effluent fluid from the at least one cooling channel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of the scope of the disclosure, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
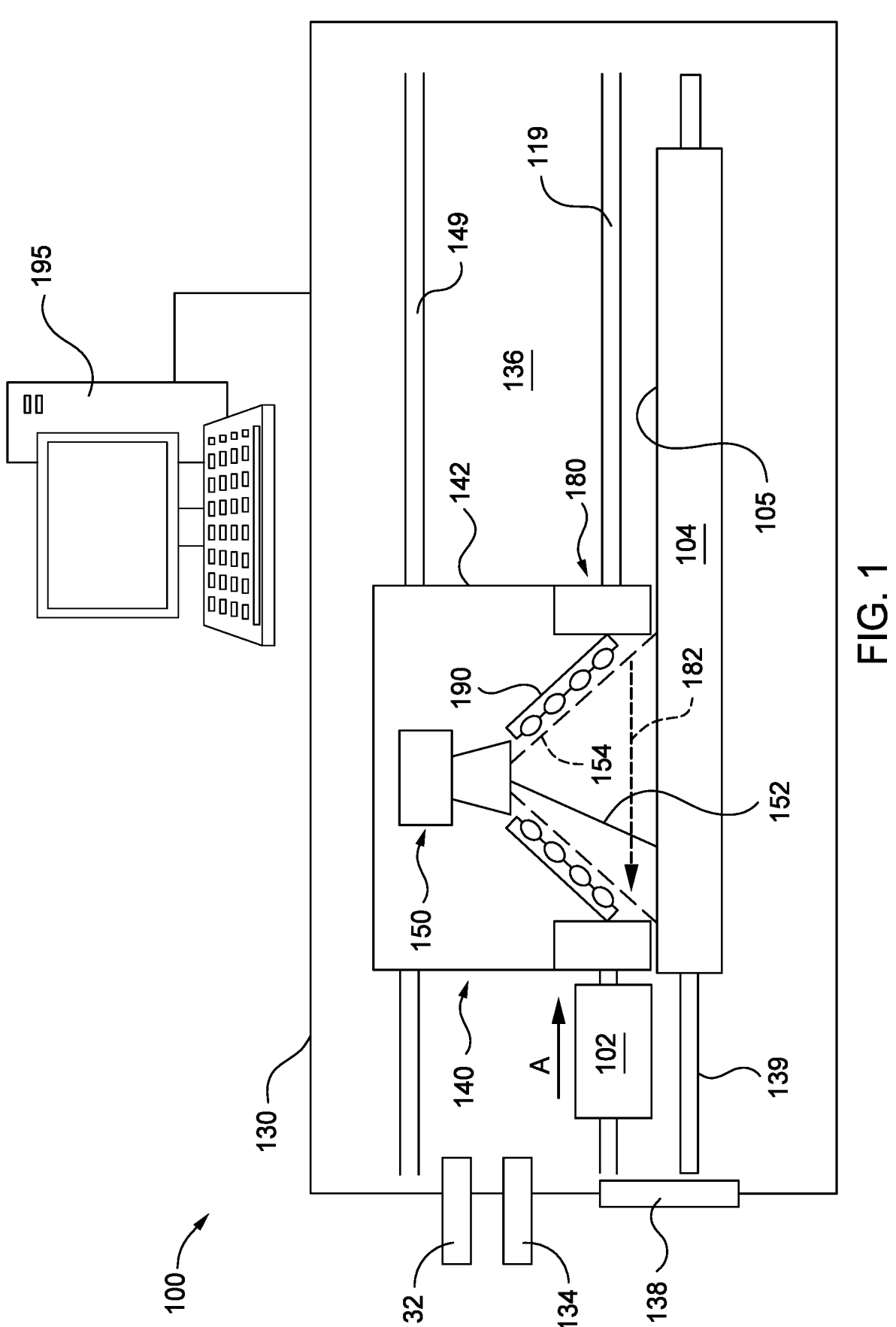
FIG. 1 is a schematic side view of an example additive manufacturing apparatus.

Embodiments herein are generally directed to a processing chamber and, more particularly, to systems and methods for manufacturing of an upper platen for chemical mechanical polishing (CMP). More particularly, embodiments provided herein include improved systems and methods for additively manufacturing an upper platen, either fully or partially, that has cooling channels within its main body.

Accordingly, the present disclosure provides a technical solution to the problems described above by providing an upper platen that is at least partially manufactured using additive manufacturing. Specifically, an upper platen is described that has cooling channels within its main body. The upper platen may then be fully manufactured using additive manufacturing such that the cooling channels are created without needing to machine the main body of the upper platen. Alternatively, the main body may have the cooling channels machined then sealed by a cover that is deposited on the main body using additive manufacturing. The use of additive manufacturing as described in the present disclosure removes the need for a brazing process to seal the cooling channels of the upper platen, saving time and expense when producing the upper platen.

The term "additive manufacturing" refers to a collection of versatile fabrication techniques for rapid prototyping and manufacturing of parts that allow three-dimensional digital models (CAD designs) to be converted to three dimensional objects by depositing multiple thin layers of material according to a series of two-dimensional, cross-sectional deposition maps. Additive manufacturing may comprise deposition of material in different states including liquid, powder, and as fused material. A variety of materials can be processed using additive manufacturing methods, including metals, alloys, ceramics, polymers, composites, airy structures, and multi-phase materials.

Specific examples of additive manufacturing techniques may include stereolithography (SLA), digital light processing (DLP), fused deposition modeling (FDM), selective laser sintering (SLS), selective laser melting (SLM), or electronic beam melting (EBM) processes.

In stereolithography (SLA), a tank of liquid ultraviolet curable resin is used in combination with a scanned laser beam to cure one thin layer of resin at a time according to a two-dimensional exposure pattern. When one layer is done, the bed or base that it was cured on is lowered slightly into the tank and another layer is cured. The build platform repeats the cycle of layer curing and downward steps until the part is complete. The time required for each cycle of the process depends on the cross-sectional area of the part and the spatial resolution required. When the part is complete, it is completely submerged in the uncured resin. It is then pulled from the tank and may optionally be further cured in an ultraviolet oven.

Digital light processing (DLP) is a variation of SLA in which a vat of liquid polymer is exposed to light from a DLP projector, which uses one or more digital micromirror array devices, under safelight conditions. The DLP projector projects the image of a three-dimensional model onto the liquid polymer. The exposed liquid polymer hardens and the build plate moves down and the liquid polymer is once more exposed to light. The process is repeated until the three-dimensional object is complete and the vat is drained of liquid, revealing the solidified model.

Fused deposition modeling (FDM), also called Fused Filament Fabrication (FFF), can print in a variety of plastics or polymers, and typically print with a support material. FDM printers use extruder heads that super heat the input plastic filament so that it becomes a liquid, and then push the material out in a thin layer to slowly fabricate an object in a layer-by-layer process.

Selective laser sintering (SLS) uses a laser to fuse material together layer by layer. A layer of powder is pushed onto the build platform and heated by a laser, optionally compressed, so that it fuses without passing through a liquid state. Once the layer is complete, another layer of powder is applied and heated again. The process requires no support material as the leftover material holds it upright. After the part is complete, one removes it from the powder bed and cleans off any excess material.

In selective laser melting (SLM), a high-power laser is used to melt and fuse metallic powders to form layers. A part is built by selectively melting and fusing powders within and between layers. SLM is a direct write technique and has been proven to produce near net-shape parts (i.e., fabricated parts that are very close to the final (net) shape, thereby reducing the need for surface finishing and greatly reducing production costs) with up to 99.9% relative density. This enables the process to build near full density functional parts. SLM may also process different metallic materials, such as copper, aluminum, and tungsten, as well as ceramic and composite materials.

Electronic beam melting (EBM), similar to SLM, fabricates parts by melting metal powder layer by layer with an electron beam under high vacuum. In contrast to sintering techniques, both EBM and SLM achieve full melting of the metal powder and produce fully dense metal parts which have the characteristics of the target material. The EBM deposition apparatus reads data from a three-dimensional CAD model and lays down successive layers of powdered material. These layers are melted together with an electron beam under vacuum, which makes it suitable for the manufacture of parts using reactive materials with a high affinity for oxygen, e.g., titanium.

FIG. 1 illustrates an example additive manufacturing apparatus 100 that includes a printhead 102 and a build platform 104 (e.g., a build stage). The printhead 102 dispenses layers of one or more powders on a top surface 105 of the platform 104. By repeatedly dispensing and fusing layers of powder, the apparatus 100 can form a part on the platform.

The printhead 102 and the build platform 104 can both be enclosed in a housing 130 that forms a sealed chamber 136, e.g., a vacuum chamber, which provides a controlled operating environment. The chamber 136 can include an inlet 132 coupled to a gas source (not shown) and an outlet 134 coupled to an exhaust system, e.g., a pump (not shown). The gas source can provide an inert gas, e.g. Ar, or a gas that is non-reactive at the temperatures reached by the powder for melting or sintering, e.g., N2. This permits the pressure and oxygen content of the interior of the housing 130 to be controlled. For example, oxygen gas can be maintained at a partial pressure below 0.01 atmospheres.

The chamber 136 may be maintained at atmospheric pressure (but at less than 1% oxygen) to avoid the cost and complexity of building a fully vacuum compatible system. Oxygen content can be below 50 ppm when the pressure is at 1 atmosphere, e.g., when dealing with Ti powder. A load lock chamber (not shown) accessible through a valve 138, e.g., a slit valve, can be used to separate the chamber 136 from the external environment while permitting parts, e.g., the build platform with the fabricated object, to be removed from the chamber 136. For example, the build platform 104 can be movable on a track 139, e.g., a rail.

The printhead 102 is configured to traverse the platform 104. For example, the apparatus 100 can include a support, e.g., a linear rail or pair of linear rails 119, along which the printhead can be moved by a linear actuator or motor (not shown). This permits the printhead 102 to move across the platform 104 along a first horizontal axis. In some implementations, the printhead 102 can also move along a second horizontal axis perpendicular to the first axis.

The printhead 102 can also be movable along a vertical axis. In particular, after each layer is fused, the printhead 102 can be lifted by an amount equal to the thickness of a deposited layer of powder. This can maintain a constant height difference between the dispenser on the printhead and the top of the powder on the platform 104. A drive mechanism, e.g., a piston or linear actuator (not shown), can be connected to the printhead or support holding the printhead to control the height of the printhead. Alternatively, the printhead 102 can be held in a fixed vertical position, and the platform 104 can be lowered after each layer is deposited.

The apparatus 100 also includes powder fusing assembly 140 that can translate across the build platform 104. The powder fusing assembly 140 includes at least one energy delivery system 150 that can generate at least one light beam 152 that is directed toward the uppermost layer of powder on the platform 104 and that can be used at least for fusing of the layer of powder on the platform 104. The light beam 152 or another light beam can be used for pre-heating or heat-treating the layer of powder.

The powder fusing assembly 140 also includes an air knife 180 to generate a flow of gas 182 across the layer of powder. This flow of gas 182 can help reduce spatter caused by fusing of the powder by the light beam 152.

As noted above, the powder fusing assembly 140 can translate across the build platform 104. For example, the apparatus 100 can include a support, e.g., a linear rail or pair of linear rails 149, along which the powder fusing assembly 140 can be moved by a linear actuator or motor (not shown). In some implementations, the printhead 102 and the powder fusing assembly 140 are independently movable. In some implementations, the powder fusing assembly 140 can translate along the same direction (e.g., shown by arrow A) as the printhead 102. Alternatively, the powder fusing assembly 140 can translate along a horizontal direction perpendicular to direction travelled by the printhead.

In some implementations, the printhead 102 and powder fusing assembly 140 are supported by and movable on the same support, e.g., the linear rail or pair of linear rails 119. In some implementations, the printhead 102 and the powder fusing assembly 140 are physically connected in a fixed position relative to each other. In this case, the printhead 102 and powder fusing assembly 140 move together, e.g., by the same actuator or motor.

In some implementations, the printhead 102 and the powder fusing assembly 140 are mechanically coupled to the same vertical actuator such that both are movable up or down together. This permits the dispenser(s) and any beam scanner(s) of the powder fusing assembly to maintain a constant distance from the uppermost layer of powder on a layer-by-layer basis.

The apparatus 100 includes a controller 195 coupled to the various components of the apparatus, e.g., power sources for the light sources and heaters, actuators or motors to move the printhead 102 and powder fusing assembly 140, actuators or motors for the components, e.g., dispensers and beam scanners, within the printhead 102 and powder fusing assembly 140, etc., to cause the apparatus to perform the necessary operations to fabricate an object.

The controller 195 can include a computer aided design (CAD) system that receives and generates CAD data. The CAD data is indicative of the object to be formed, and, as described herein, can be used to determine properties of the structures formed during additive manufacturing processes. Based on the CAD data, the controller 195 can generate instructions usable by each of the systems operable with the controller 195, for example, to dispense the powder, to fuse the powder, to move various systems of the apparatus 100, and to sense properties of the systems, powder, and the object. In some implementations, the controller 195 can control the printhead 102 to selectively deliver powder to different regions.

Figure 2:
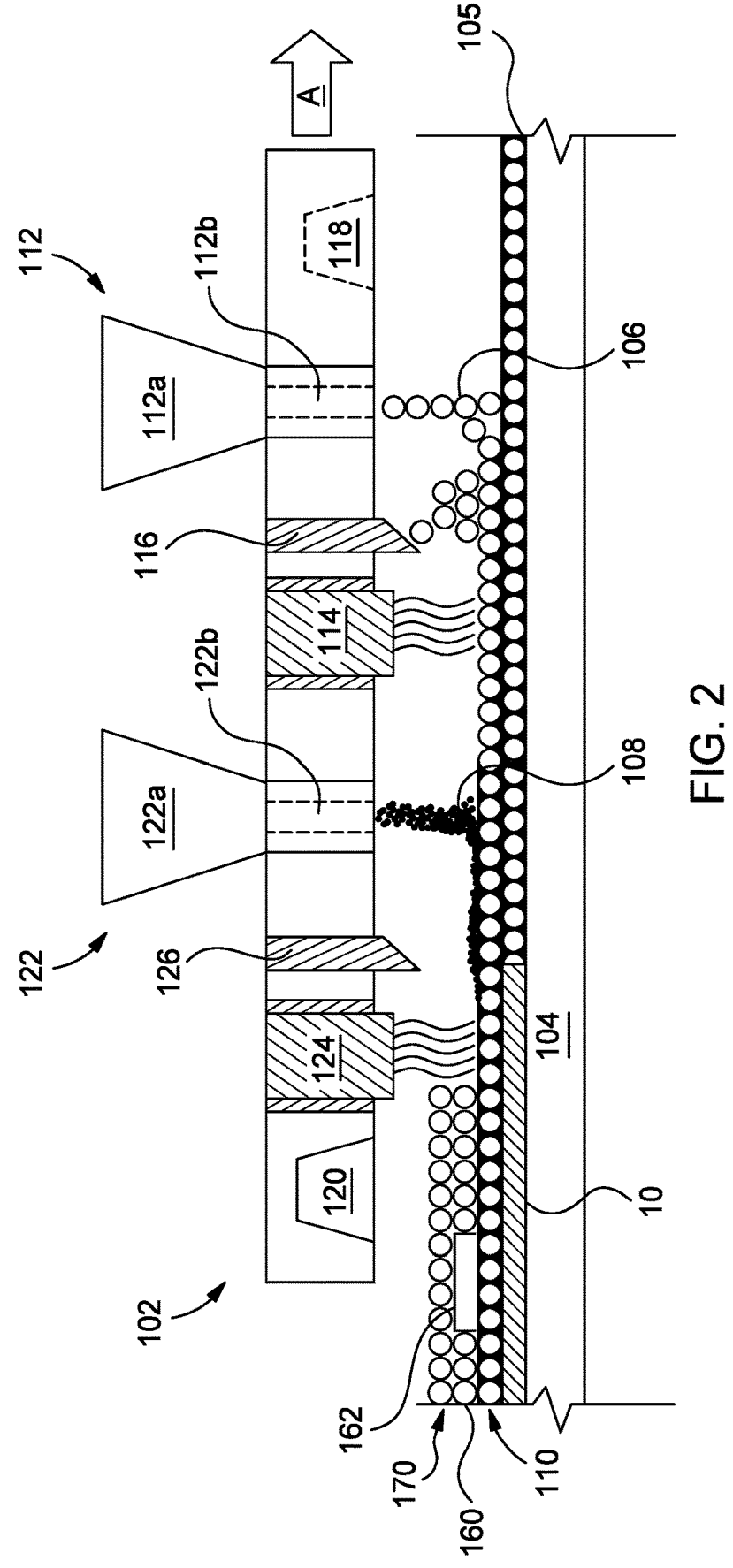
FIG. 2 is a schematic side view of a printhead of the additive manufacturing apparatus of FIG. 1, according to some embodiments.

The controller 195, for example, can transmit control signals to drive mechanisms that move various components of the apparatus. In some implementations, the drive mechanisms can cause translation or rotation of these different systems, including. Each of the drive mechanisms can include one or more actuators, linkages, and other mechanical or electromechanical parts to enable movement of the components of the apparatus FIG. 2 is an enlarged schematic view of the printhead 102 during manufacture of an object 10. As shown in FIG. 2, the printhead 102 includes at least a first dispenser 112 to selectively dispense a layer 110 of a powder 106 on the build platform 104, e.g., directly on the build platform 104 or on a previously deposited layer. The first dispenser 112 includes a hopper 112a to receive the powder 106. The powder 106 can travel through a channel 112b having a controllable aperture, e.g., a valve, that controls whether the powder is dispensed onto the platform 104. In some implementations, the first dispenser 112 includes a plurality of independently controllable apertures, so that the powder can be controllably delivered along a line perpendicular to the direction of travel.

Optionally, the printhead 102 can include a heater 114 to raise the temperature of the deposited powder. The heater 114 can heat the deposited powder to a temperature that is below its sintering or melting temperature. The heater 114 can be, for example, a heat lamp array. The heater 114 can be located, relative to the forward moving direction of the printhead 102, behind the first dispenser 112. As the printhead 102 moves in a forward direction, the heater 114 moves across the area where the first dispenser 112 was previously located.

Optionally, the printhead 102 may also include a first spreader 116, e.g., a roller or blade, which cooperates with the first dispenser 112 to compact and spread powder dispensed by the first dispenser 112. The first spreader 116 can provide the layer with a substantially uniform thickness. In some cases, the first spreader 116 can press on the layer of powder to compact the powder.

The printhead 102 can also optionally include a first sensing system 118 and a second sensing system 120 to detect properties of the layer before and/or after the powder has been dispensed by the first dispenser 112.

In some implementations, the printhead 102 includes a second dispenser 122 to dispense a second powder 108. The second dispenser 122, if present, can be constructed similarly to the first dispenser 112 with a hopper 122*a* and channel 122*b*. A second spreader 126 can operate with the second dispenser 122 to spread and compact the second powder 108. A second heater 124 can be located, relative to the forward moving direction of the printhead 102, behind the second dispenser 122.

The first powder 106 can have a larger mean diameter than the second powder 108, e.g., by a factor of two or more. When the second powder 108 is dispensed on a layer of the first powder 106, the second powder 108 infiltrate the layer of first powder 106 to fill voids within the first powder 106. The second powder 108, being smaller than the first powder 106, can achieve a higher resolution, higher pre-sintering density, and a higher compaction rate.

In implementations when multiple types of powders are used, the first dispenser 112 and the second dispensers 122 can deliver the first powder 106 and the second powder 108 each into different selected areas, depending on the resolution requirement of the portion of the object 10 to be formed.

In implementations with two different types of powders, in some cases, the first powder 106 and the second powder 108 can be formed of different materials, while, in other cases, the first powder 106 and the second powder 108 have the same material composition. In an example in which the apparatus 100 is operated to form a metal object and dispenses two types of powder, the first powder 106 and the second powder 108 can have compositions that combine to form a metal alloy or intermetallic material.

Examples of metallic particles include metals, alloys and intermetallic alloys. Examples of materials for the metallic particles include aluminum, titanium, stainless steel, nickel, cobalt, chromium, vanadium, and various alloys or intermetallic alloys of these metals. Examples of ceramic materials include metal oxide, such as ceria, alumina, silica, aluminum nitride, silicon nitride, silicon carbide, or a combination of these materials.

The processing conditions for additive manufacturing of metals and ceramics are significantly different than those for plastics. For example, in general, metals and ceramics require significantly higher processing temperatures. Thus, three-dimensional printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

Figure 3A:
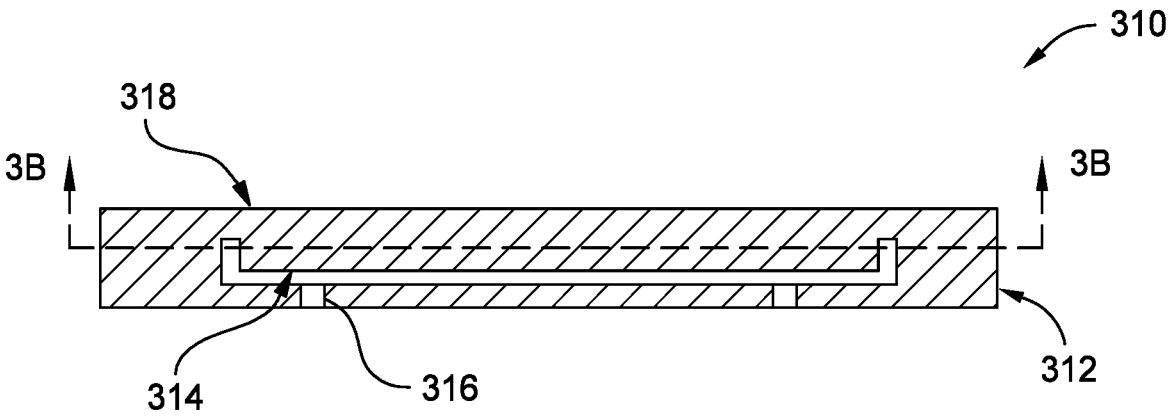
FIG. 3A is a cross-sectional side view of a platen, according to some embodiments.
Figure 3B:
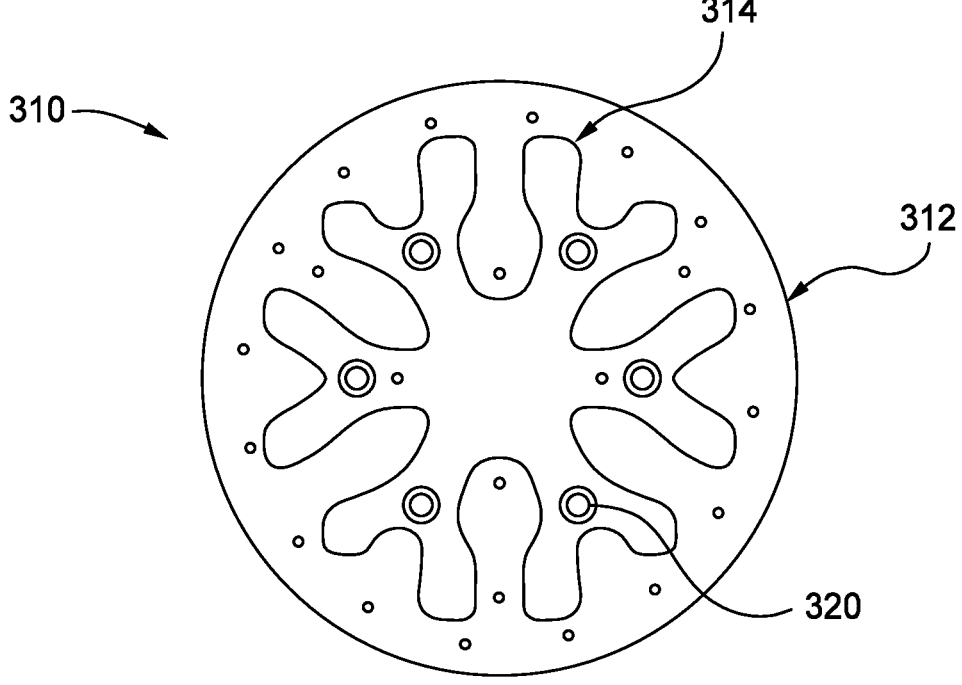
FIG. 3B is a cross-sectional top view of the platen of FIG. 3A, according to some embodiments.
Figure 3C:
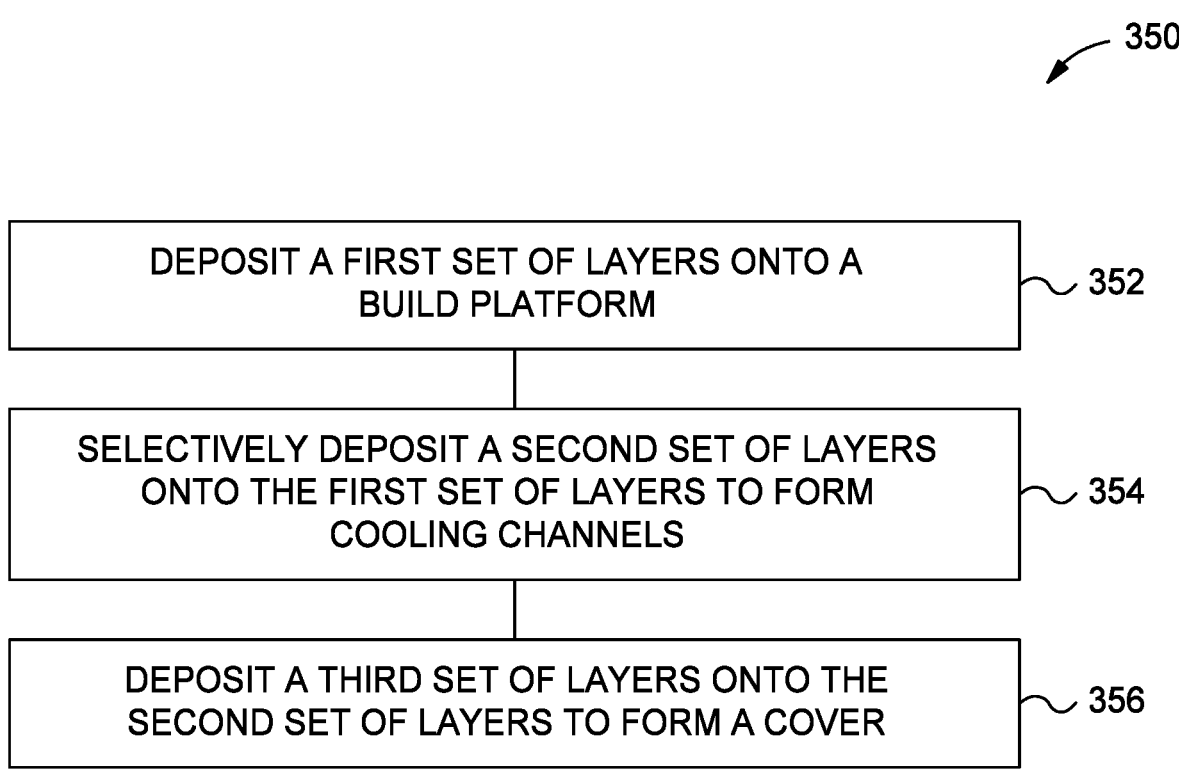
FIG. 3C is a flow diagram of a method of manufacturing a platen, according to some embodiments.

FIGS. 3A and 3B show a cross-sectional side view and a cross-sectional top view, respectively, of a platen 310 that is manufactured using the additive manufacturing apparatus 100. The platen 310 includes a platen main body 312, cooling channels 314, drains 316, and a cover 318. The platen may be manufactured using a method 350 illustrated in FIG. 3C with a powder-based additive manufacturing method, such as selective laser sintering (SLS), selective laser melting (SLM), or electronic beam melting (EBM), such as the apparatus 100 as shown in FIGS. 1 and 2. The platen 310 may be made of a metallic material, a ceramic material, or a combination thereof. Alternatively, the platen 310 may be made of a plastic or polymer material additively manufactured using a fused deposition modeling (FDM) or stereolithography following method 350.

Referring to FIGS. 1-3C, the controller 195 of the additive manufacturing apparatus 100 may receive three-dimensional CAD data including the structure of the platen 310. The controller 195 may then control the printhead 102 to selectively deposit a first set of layers 110 of the first powder 106 through the first dispenser 112 onto the build platform 104 as in block 352 of FIG. 3C. The first set of layers 110 may comprise any number of layers 110, including 1 layer or more, 2 layers or more, or 3 layers or more. The first powder 106 of the first set of layers 110 may be spread using the first spreader 116 to provide a uniform thickness before being heated by the heater 114. Optionally, the printhead 102 may deposit the second powder 108 via the second dispenser, which may be spread by the second spreader 126 and subsequently heated by the second heater 124.

Subsequent layers of the first set of layers 110 may then be selectively deposited on top of each other to produce the platen main body 312. In block 354, a second set of layers 160 may be selectively deposited on the first set of layers 110. Selectively depositing a second set of layers 160 includes leaving gaps 162 within each of the layers 160 such that there is a gap 162 in the finished layer. These gaps 162 may create features of the platen 310, such as the drains 316 and the cooling channels 314.

In block 356, a third set of layers 170 may be selectively deposited on the second set of layers 160 which may create the cover 318 of the platen 310. Selectively depositing the third set of layers 170 includes depositing a layer 170 such that gaps 162 in the second set of layers 160 (e.g., layers below) are closed, such as when depositing layers of the cover 318 of the platen 310.

Although a powder-based additive manufacturing method is described, the platen 310 may also be manufactured using droplet-based additive manufacturing techniques. These techniques, such as stereolithography, may be preferred when the platen 310 is to be made of a polymer material such as PEEK or PEKK. In such circumstances, the first set of layers 110, the second set of layers 160, and the third set of layers 170 of the polymer may be selectively cured in a tank of ultraviolet curable resin to produce the cooling channels 314, the drains 316, and the cover 318 of the platen 310. Similarly, fused deposition modeling (FDM) may be used where a polymer filament is super-heated to selectively deposit the first set of layers 110, the second set of layers 160, and the third set of layers 170 to fabricate the platen 310.

Producing the upper platen 310 using additive manufacturing techniques such as SLS, SLM, or EBM, eliminates the use of a brazing process, reducing cost, and allows control of the surface profile (e.g., to create a flatter surface) of the upper platen. Additive manufacturing of the upper platen 310 also allows control of the shape of the cooling channels 314, improving heat transfer performance.

Figure 4A:
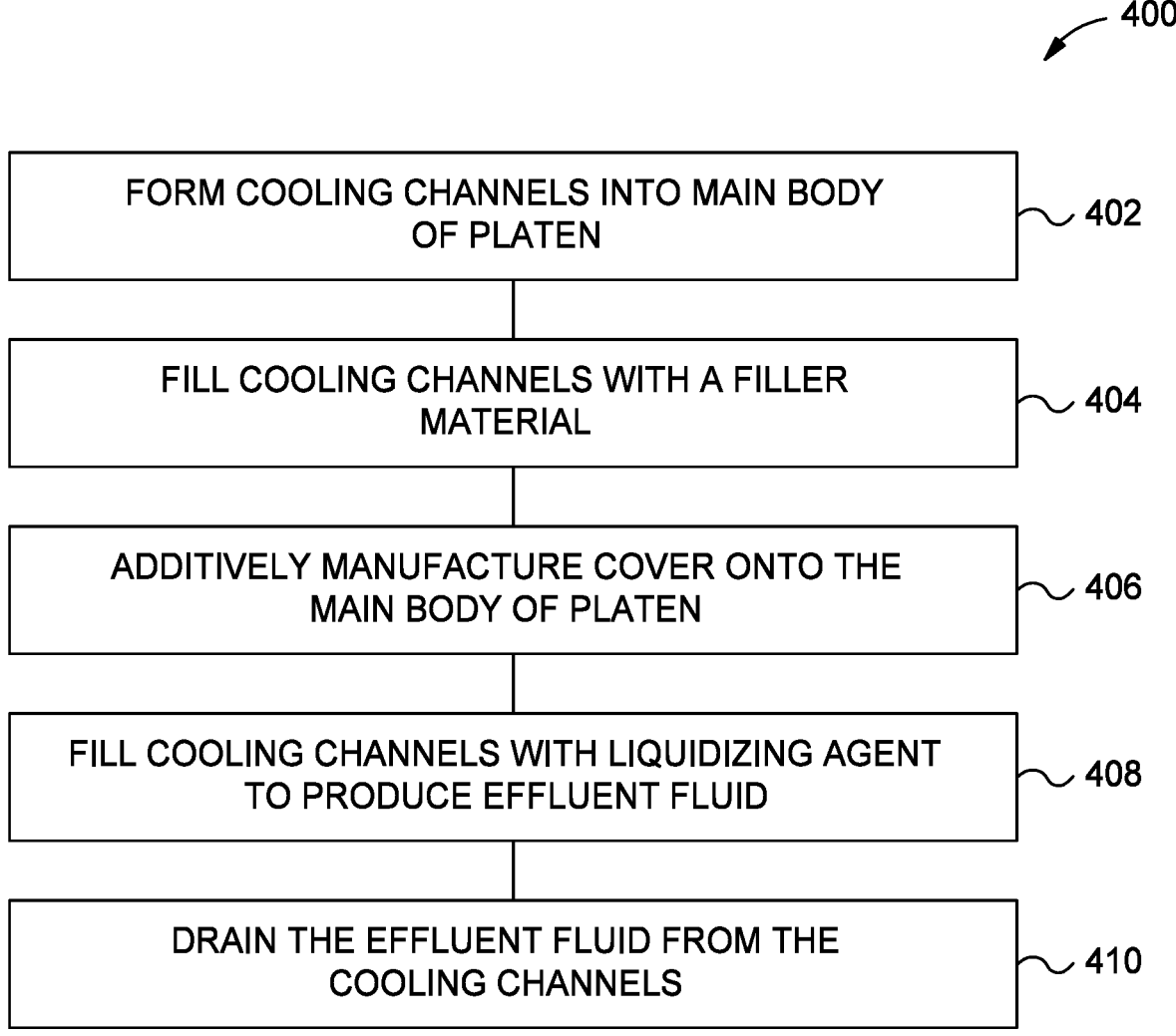
FIG. 4A is a flow diagram of a method of manufacturing a platen, according to some embodiments.
Figure 4B:
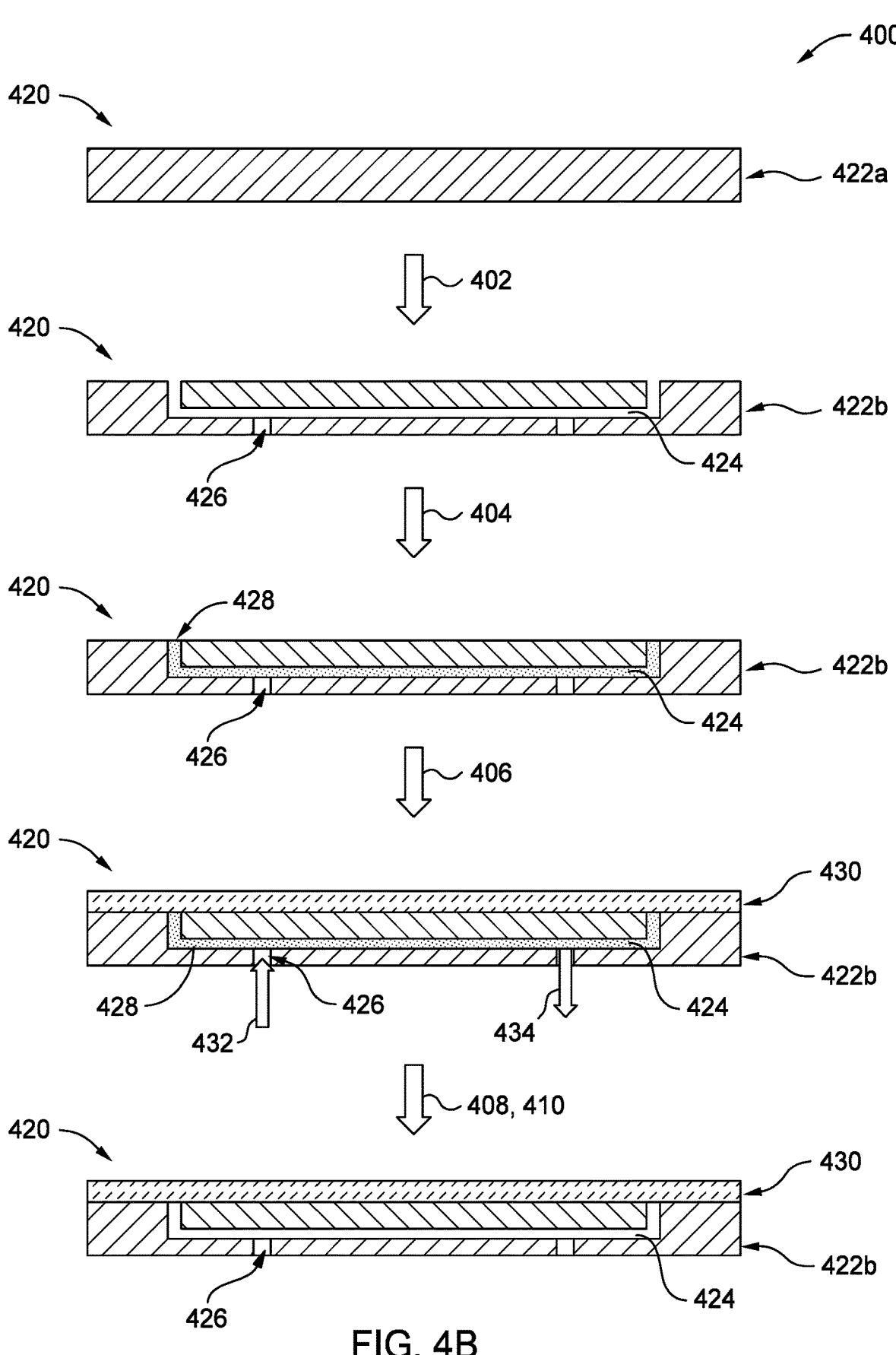
FIG. 4B is a schematic cross-sectional view of a platen undergoing the method of FIG. 4A, according to some embodiments.

FIG. 4A is a method 400 of manufacturing an upper platen 420 according to another embodiment. FIG. 4B is a schematic cross-sectional view of the platen 420 undergoing the method of FIG. 4A. In block 402, a platen main body 422*a* may have cooling channels 424 and drains 426 machined using conventional machining methods on a surface of the main body 422*a* as desired to produce a machined main body 422*b*. At block 404, the cooling channels 424 are filled with a filler material 428 such that the inner volume of the cooling channels 424 contain the filler material 428, but the filler material 428 does not overflow onto other portions, e.g., the upper surface, of the machined main body 422*b*. The composition of the filler material 428 is such that the filler material 428 does not bond or intermix with the platen main body 422*a* at the operating temperatures or pressures of the additive manufacturing apparatus 100.

Once the cooling channels 424 are filled with the filler material 428, a cover 430 may be additively manufactured, at block 406, onto the upper surface of the machined main body 422*b*, covering the cooling channels 424 and, optionally, the upper surface of the main body 422*b*. The cover 430 may be additively manufactured using a powder-based additive manufacturing method, such as selective laser sintering (SLS), selective laser melting (SLM), or electronic beam melting (EBM), using an additive manufacturing apparatus (e.g., additive manufacturing apparatus 100). The cover 430 may be manufactured similarly to cover 318 of FIGS. 3A-3C (e.g., selectively depositing a third set of layers 170). The cover 430 may be made of a metallic material such as aluminum or stainless steel. Alternatively, the cover 430 may be made of a plastic or polymer material, such as PEEK or PEKK, and additively manufactured using a fused deposition modeling (FDM) or stereolithographic method.

At block 408, the filler material 428 is exposed to a liquidizing agent 432. The liquidizing agent 432 is an agent or solvent that, when exposed to the filler material 428, reacts with the filler material and produces an effluent fluid 434. The effluent fluid 434 may be drained through the drains 426 of the cooling channels 424. The liquidizing agent 432 may be introduced to the filler material 428 through the drains 426. The liquidizing agent 432 and the effluent fluid 434 may be pumped into and out of the cooling channels 424, may be drained using gravity, or a combination thereof at block 410. The upper platen 420 may then undergo further processing. For example, the effluent fluid 434 may be flushed from the cooling channels 424 or the upper platen 420 may undergo a rinse process to remove the effluent fluid 434.

Using additive manufacturing to partially produce the platen 420 eliminates the need for a brazing process and reduces cost. Further, only partially producing the platen 420 using additive manufacturing, as described, may further reduce cost compared to fully producing the platen 420 through additive manufacturing, depending on the additive manufacturing method chosen.

When introducing elements of the present disclosure or exemplary aspects or embodiment(s) thereof, the articles "a," "an," "the" and "said" are intended to mean that there are one or more of the elements.

The terms "comprising," "including" and "having" are intended to be inclusive and mean that there may be additional elements other than the listed elements.

The term "coupled" is used herein to refer to the direct or indirect coupling between two objects. For example, if object A physically touches object B and object B touches object C, the objects A and C may still be considered coupled to one another—even if objects A and C do not directly physically touch each other. For instance, a fist object may be coupled to a second object even though the first object is never directly in physical contact with the second object.

While the foregoing is directed to embodiments of the present disclosure, other and further embodiments of the disclosure may be devised without departing from the basic scope thereof, and the scope thereof is determined by the claims that follow.

What is claimed is:

1. A method, of manufacturing a component for a semiconductor processing apparatus, comprising:

selectively depositing a first set of layers using an additive manufacturing apparatus; and selectively depositing a second set of layers on the first set of layers, each of the second set of layers comprising at least one gap, wherein the first set of layers and the second set of layers form the component, and wherein the at least one gap forms at least one cooling channel through the component;

selectively deposit a filler material in the at least one cooling channel; and filling the at least one cooling channel with a liquidizing agent, wherein the liquidizing agent reacts with the filler material to produce an effluent fluid.

2. The method of claim 1, further comprising:

selectively depositing a third set of layers on the second set of layers such that the third set of layers cover the at least one gap.

3. The method of claim 1, wherein selectively depositing the first set of layers comprises depositing a first powder on a build platform and the second set of layers comprises depositing a second powder on the build platform.

4. The method of claim 1, wherein selectively depositing the first set of layers and second set of layers comprises super-heating a polymer material onto a build platform.

5. The method of claim 1, wherein selectively depositing the first set of layers and second set of layers comprises curing layers of a resin.

6. The method of claim 1, wherein the first set of layers comprises aluminum, stainless steel, or a combination thereof.

7. The method of claim 1, wherein selectively depositing the first set of layers comprises depositing a first powder and depositing a second powder, wherein the first powder has a larger mean diameter than the second powder.

8. A method, of manufacturing a component for a semiconductor processing apparatus, comprising:

depositing a plurality of layers using an additive manufacturing apparatus, wherein the plurality of layers define a body of a platen for use in a polishing process for a semiconductor substrate and at least one cooling channel defined in the body;

depositing a filler material in the at least one cooling channel; and filling the at least one cooling channel with a liquidizing agent, wherein the liquidizing agent reacts with the filler material to produce an effluent fluid.

9. The method of claim 8, further comprising:

selectively depositing an additional set of layers on the plurality of layers such that the additional set of layers define a cover for the platen.

10. The method of claim 8, wherein depositing the plurality of layers comprises depositing a first powder and depositing a second powder, wherein the first powder has a larger mean diameter than the second powder.

11. The method of claim 8, wherein depositing the plurality of layers comprises super-heating a polymer material onto a build platform.

12. The method of claim 8, wherein depositing the plurality of layers comprises curing layers of a resin.

13. The method of claim 8, wherein the plurality of layers comprises aluminum, stainless steel, or a combination thereof.

* * * * *